United States Patent Office 3,315,995
Patented Apr. 25, 1967

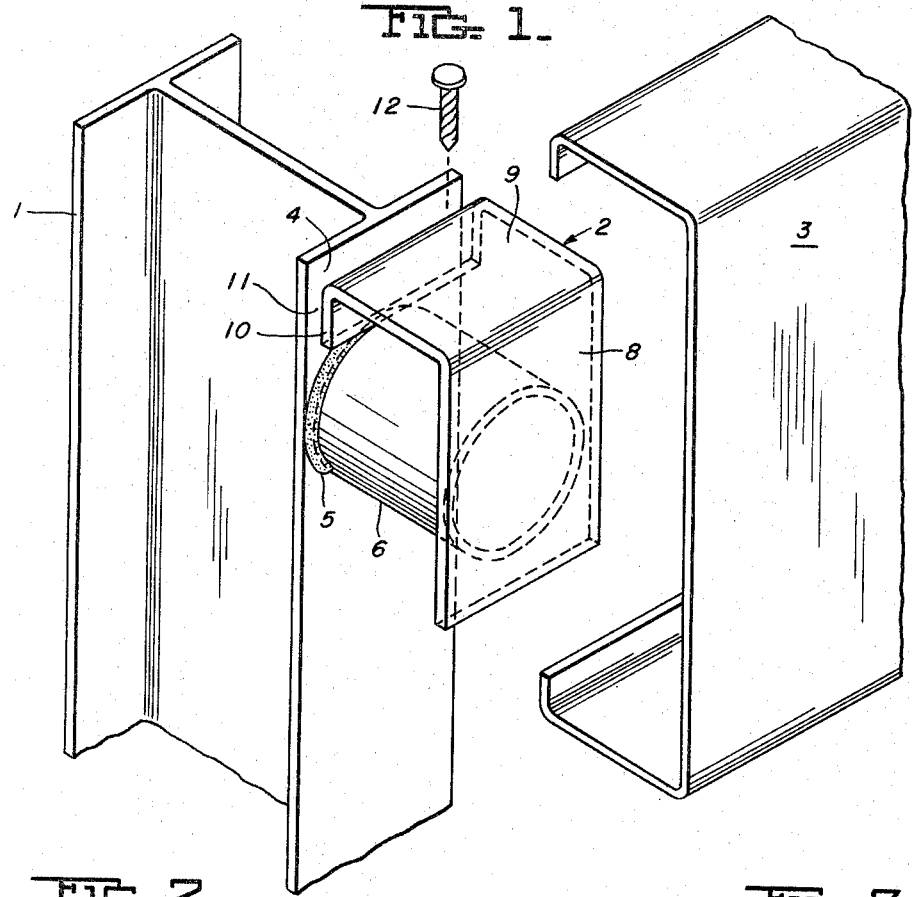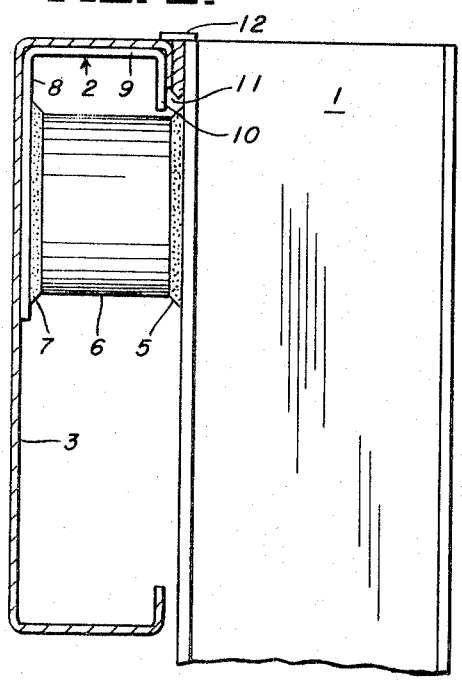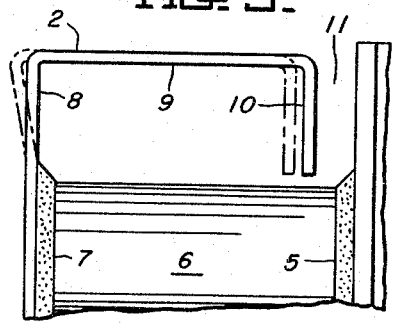

3,315,995
COLUMN AND BEAM CONNECTION
Robert I. Hossli, Forest Hills Borough, and George D. Ratliff, Jr., Churchill Borough, Pa., assignors to United States Steel Corporation, a corporation of Delaware
Filed Apr. 16, 1964, Ser. No. 360,332
1 Claim. (Cl. 287—189.36)

This invention relates to bracket means for rigidly connecting metallic C-shaped beams, and the like, to a column.

While the invention has wider applicability, it is particularly advantageous in the erection of prefabricated homes and the like, employing metal columns and beams, for which purpose the brackets may be prefabricated, thereby necessitating only a simple assembly operation at the building site to effect beam to column connection.

A particular feature of the invention is the mode of obtaining rigidity in the connection.

These and other aspects of the invention will be more readily apparent upon reference to the drawing, wherein:

FIGURE 1 is an isometric view of a bracket of the invention;

FIGURE 2 shows a side view of the braket, with beam to column connection made; and FIGURE 3 illustrates, in exaggeration, the movement of bracket portions upon completion of the connection.

Referring particularly to FIGURE 1, I-shaped column 1 is fitted with a bracket 2 adapted to receive C-shaped beam 3.

Column 1 preferably has a generally flat vertical surface 4 at the point of beam connection. Bracket 2 is attached to surface 4 by weld 5 securing thereto one end of a section of pipe 6. The pipe has been sectioned generally perpendicularly to its major axis, resulting in the end faces thereof being substantially parallel and at right angles to the pipe axis. The end face on pipe 6, which is remote from surface 4, is joined by weld 7 to vertical plate element 8. Continuous with plate element 8 are horizontal plate element 9, extending toward surface 4, and vertical plate element 10, depending therefrom.

The outer surfaces of plate elements 8, 9 and 10 constitute a beam seat to engage the inner surfaces of the upper portion of the C-shaped beam 3. The plate elements and beam are cooperatively contoured to provide a generally nesting and wrap-around relationship, upon installation, as shown in FIGURE 2.

The length of pipe 6 is so chosen as to provide a separation 11 between surface 4 and plate element 10, which separation is sufficient, after assembly of beam 3, to permit insertion of wedging means, preferably a common nail 12. While plate element 10 may rest upon pipe 6, it is not attached thereto at its lower edge. This in conjunction with the appropriate extension of plate element 8 above pipe 6, permits the springing and prestressing movement depicted in FIGURE 3, upon forceful insertion of nail 12. The broken lines in FIGURE 3 depict, in exaggeration the flexing of vertical element 8, and the displacement of vertical element 10, incident to the prestressing. Although the force involved in insertion of nail 12 may be moderate, the prestressing action produced results in a connection of beam to column that is highly rigid. Accordingly, the invention eliminates the necessity of transporting specialized equipment, such as welding apparatus, and specially qualified personnel, to the building site, a factor of importance in the effective utilization of specialized equipment and talents, especially where only a relatively few beam to column connections are required for an isolated home.

The connection lends itself to ready disassembly.

While the invention has been principally described with reference to metals, it is applicable to use with any materials formable in C-channel and the like.

Although the invention is particularly adapted to C-shaped beams, it will be appreciated that other sections having similar overhanging lips may similarly be connected by the bracket means of the invention.

Also, although pipe is preferred as a support for the beam seat, other shapes, such as U-shaped sections, for example, may be employed.

It will be apparent that other adaptations and modifications may be made without departing from the scope of the following claim.

We claim:

A bracket connection between a column and a C-shaped beam or the like comprising
(a) a column presenting a generally flat vertical surface at the point of beam connection;
(b) a first vertical plate element parallel to said column surface and spaced therefrom;
(c) a horizontal plate element attached to the upper edge of said first vertical plate and extending outwardly from the column;
(d) a second vertical plate element depending from the remote edge of said horizontal plate, said second vertical plate being parallel to said first vertical plate;
(e) a section of pipe having first and second parallel faces formed by sectioning the pipe generally perpendicularly to its major axis, said first face being attached to said column surface and said second face being attached to the column-facing surface of said second vertical plate;
(f) a C-shaped beam adapted to engage with its upper inside surfaces, in generally nesting and wrap-around relationship, the column-facing surface of said first vertical plate, the surface of said horizontal plate, and the outer surface of said second vertical plate, with space remaining between the beam and said column surface; and
(g) a nail inserted in the space between said beam and column surfaces to spring the said plate elements to secure the beam to the column.

References Cited by the Examiner

UNITED STATES PATENTS

| | | | |
|---|---|---|---|
| 1,596,360 | 8/1926 | Krey | 52—364 |
| 1,824,631 | 9/1931 | Saxe | 287—189.36 |
| 2,374,550 | 4/1945 | McIntosh | 287—189.36 |
| 2,995,223 | 8/1961 | Roys | 287—189.36 |
| 3,220,518 | 11/1965 | Deming | 287—189.36 |
| 3,239,070 | 3/1966 | Clauson | 256—59 X |

HARRISON R. MOSELEY, *Primary Examiner.*

P. C. KANNAN, *Assistant Examiner.*